US005251110A

United States Patent [19]

Leleve

[11] Patent Number: 5,251,110

[45] Date of Patent: Oct. 5, 1993

[54] MULTI-FUNCTION HEADLAMP FOR A MOTOR VEHICLE, ADAPTED TO IMPROVE THE ILLUMINATION OF ROAD SIGNS

[75] Inventor: Joël Leleve, Epinay-sur-Seine, France

[73] Assignee: Valeo Vision, Bobigny Cedex, France

[21] Appl. No.: 722,659

[22] Filed: Jun. 28, 1991

[30] Foreign Application Priority Data

Jul. 3, 1990 [FR] France ........ 90 08392

[51] Int. Cl.[5] ........ B60Q 1/04

[52] U.S. Cl. ........ 362/61; 362/277; 362/293

[58] Field of Search ........ 361/61, 80, 277, 282, 361/283, 293, 319, 321, 351, 346

[56] References Cited

U.S. PATENT DOCUMENTS

| | | | |
|---|---|---|---|
| 1,205,224 | 11/1916 | Koechlein | 362/284 |
| 1,289,244 | 12/1918 | Otte | 362/351 |
| 1,562,715 | 11/1925 | Naylor | 362/284 |
| 1,591,992 | 9/1926 | Nave | 362/284 |
| 2,139,707 | 12/1938 | Denburg | 362/284 |
| 2,204,430 | 6/1940 | Montague | 362/351 |
| 2,208,079 | 7/1940 | Nosal | 362/319 |
| 4,443,834 | 4/1984 | Schafer et al. | 362/284 |
| 4,594,296 | 6/1986 | Bertus de Vrijer | 313/571 |
| 4,686,610 | 8/1987 | Cilié et al. | 362/351 |
| 4,827,367 | 5/1989 | Luciani | 362/80 |
| 4,831,506 | 5/1989 | Miyazawa | 362/284 |
| 4,970,628 | 11/1990 | Bergkvist | 362/293 |
| 4,987,521 | 1/1991 | Fratty et al. | 362/61 |
| 5,014,166 | 5/1991 | Drapper et al. | 362/61 |
| 5,023,758 | 6/1991 | Allen et al. | 362/61 |
| 5,029,050 | 7/1991 | Bergkvist | 362/293 |

FOREIGN PATENT DOCUMENTS

| | | |
|---|---|---|
| 84934 | 3/1983 | European Pat. Off. . |
| 690678 | 9/1930 | France . |
| 1296036 | 11/1962 | France . |
| 2239862 | 2/1975 | France . |
| 2536502 | 5/1984 | France . |
| 2536503 | 5/1984 | France . |
| 2054815 | 2/1981 | United Kingdom . |
| 2130704 | 6/1984 | United Kingdom . |

*Primary Examiner*—Albert J. Makay
*Assistant Examiner*—Y. Quach
*Attorney, Agent, or Firm*—McCormick, Paulding & Huber

[57] ABSTRACT

A multi-function headlamp, in particular for a motor vehicle, is arranged to improve the illumination of road signs and other external objects. It includes an occulting means for defining a cut-off line for a beam such as a dipped beam or fog penetrating beam, lamp means of the kind that emits both visible light and ultra violet radiation simultaneously, and a front closure glass of a material which is at least partially transparent to ultra violet radiation. The occulting means is also opaque to visible light radiation and at least partially transparent to ultra violet radiation, and the occulting means is mounted for displacement between an occulting position, in which it intercepts all visible radiation directed above the cut-off line, and a retracted position in which it has substantially no effect on the transmission of visible light radiation.

7 Claims, 3 Drawing Sheets

MULTI-FUNCTION HEADLAMP FOR A MOTOR VEHICLE, ADAPTED TO IMPROVE THE ILLUMINATION OF ROAD SIGNS

FIELD OF THE INVENTION

This invention relates to a multi-function headlamp, in particular for an automotive vehicle, of a kind which is adapted to improve the illumination of road signs and other external objects. More particularly, it relates to a headlamp of this kind which includes a cut-off or chopped lighting function, for example a facility for producing a so-called dipped beam for functioning as a fog lamp.

BACKGROUND OF THE INVENTION

When a dipped or cut-off beam or a fog penetrating beam is in use, the range of illumination afforded by the lamp is reduced, and this renders invisible or barely visible from any distance such things as road signs, route signposts, and/or warning signs of various kinds. Thus one of the objects of the present invention is to provide a headlamp with a chopped beam facility, in which this drawback is overcome.

It has already been proposed that motor vehicles can be equipped with headlamps which are adapted to emit only ultra violet radiation such as to enable road signs, of the kind having an outer coating that becomes fluorescent when subjected to ultra violet radiation, to be seen. One headlamp of that kind, for example that which is described in the specification of German published patent application No. DE 2 249 930A, is intended as an attachment for a lamp or a pair of lamps with which a motor vehicle is normally provided, in particular for headlamps having the illuminating functions normally referred to as dipped beam and main beam lighting.

Another headlamp is known from the specification of published International patent application No. WO 89/03778A, and consists of a dipped-beam headlamp which emits a light beam which is visible below a cut-off or chopping line, and which emits an ultra violet light beam above this cut-off line. A vehicle having a pair of headlamps in accordance with the above mentioned International patent application must, however, also have a further pair of headlamps which give a main or undipped beam.

In both of the prior art cases mentioned above, it is necessary to provide more than one pair of headlamps in order to obtain all the lighting functions necessary for a motor vehicle.

DISCUSSION OF THE INVENTION

The main object of the present invention is to overcome this last mentioned drawback. A further object has already been stated above.

A multi-function headlamp in accordance with the invention, in particular for a motor vehicle, being adapted to improve the illumination of road signs, is characterised by the following features in combination:

- it includes an occulting means for defining a cut-off or chopped beam;
- it includes lamp means for emitting visible radiation and ultra violet radiation simultaneously;
- the said occulting means is opaque to visible light radiation and is at least partially transparent to ultra violet radiation;
- the occulting means is mounted for displacement between an occulting position, in which it intercepts all visible radiation directed above the cut-off line, and a retracted position in which it has substantially no effect on the transmission of visible light radiation; and
- it includes a front closure lens which is at least partially transparent to ultra violet radiation.

Such a headlamp (referred to below as a headlamp of the kind described) is a multi-function headlamp which enables ultra violet radiation to be emitted above a cut-off line even when a chopped beam, such as a dipped driving beam or a flat beam for use in fog, is in use. Thus, using only a single pair of headlamps in accordance with the invention, it is possible to provide all the required lighting functions and to give at the same time a particularly effective illumination of road signs of various kinds using the ultra violet radiation.

The headlamp of the kind described, in accordance with the invention, includes a reflector which comprises two reflecting zones, at least one of which comprises a surface which is adapted to generate by itself a beam lying below a cut-off line which is oriented generally horizontally.

The best results are obtained by using, wholly or partly, the further features of the invention set out below.

The reflector may comprise a surface which is adapted to form images of the light source (defined by the said lamp means), the highest points of which are situated in the vicinity of the cut-off line.

The cut-off line may be horizontal, or may be delimited by a horizontal half plane and by a half plane which is inclined above the horizontal. In that case, the other zone of the reflector preferably comprises a surface which is adapted to generate a beam concentrated in the vicinity of the optical axis.

The occulting means may comprise either a single screen for selectively occulting the visible light radiation emitted by the light source towards the other one of the said reflecting zones of the reflector, or two screens, at least one of which is transparent to ultra violet radiation, for selectively occulting the visible light rays emitted by the light source towards the respective reflecting zones of the reflector. In that case, the screen which is arranged to intercept the rays from the light source directed towards the first mentioned of the reflecting zones of the reflector may have at least one small through hole, for allowing a predetermined quantity of light to pass through it towards the said first reflecting zone.

Preferably, the occulting screen (or each occulting screen) comprises a plate which is articulated about a horizontal axis that is fixed with respect to a direct light screen associated with the lamp means (i.e. the light source), with this plate being able to be moved into an occulting position by means of a driving or actuating means, for example an electric motor, associated with transmission means which may for example comprise a gear train and a connecting rod.

Further features, advantages and objects of the invention will become more apparent from a reading of the detailed description which follows, in which a preferred embodiment of the invention will be described together with some variants within the scope of the invention, all by way of example only and with reference to the accompanying drawings.

DESCRIPTION OF PREFERRED EMBODIMENTS OF THE INVENTION

Figure 1:
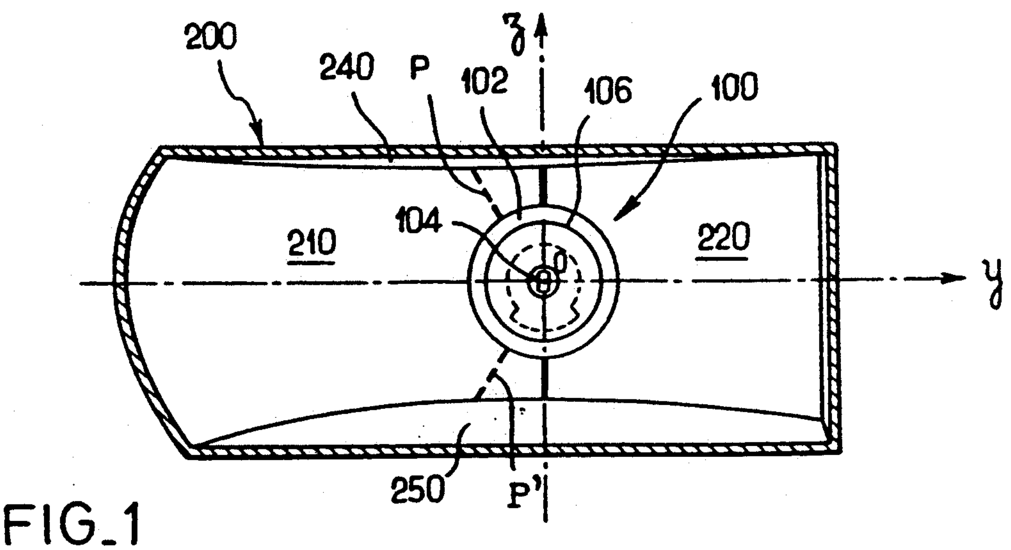
FIG. 1 is a simplified front view of a headlamp in accordance with the invention.
Figure 2:
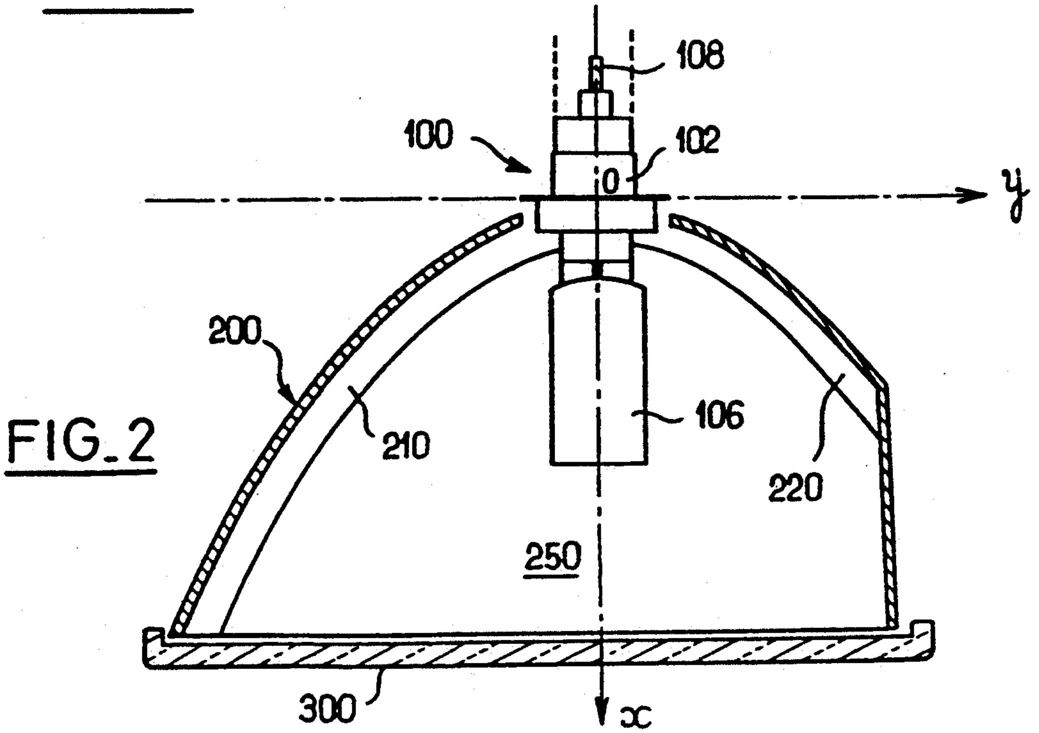
FIG. 2 is a view in horizontal cross section showing the same headlamp as in FIG. 1.
Figure 3:
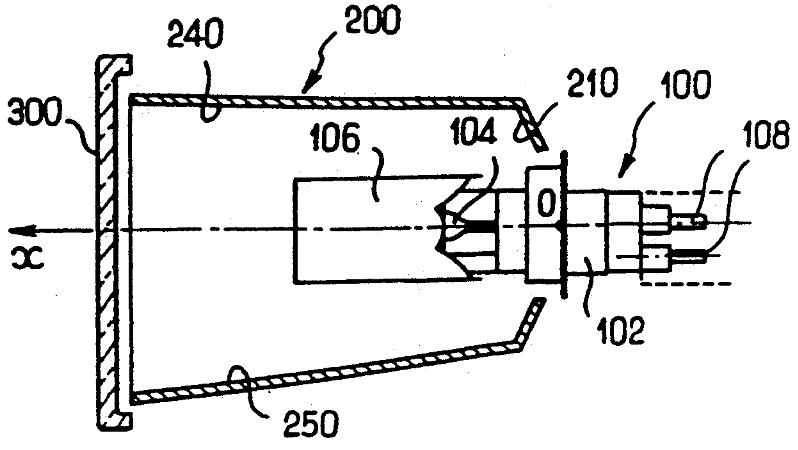
FIG. 3 is a view in vertical axial cross section showing the same headlamp.

Referring first to FIGS. 1 to 3 and FIGS. 4a and 4b, all of which relate to a preferred embodiment of the invention, the headlamp includes a light source 100 (which for convenience will be referred to as a "light bulb" to avoid confusion with the headlamp as a whole, though as will be seen below the light source may take any suitable form, for example a discharge lamp, and may consist of two emitting devices associated with each other). The light bulb 100 is of a kind which is adapted so as to emit a beam which is in both the visible spectrum and the ultra violet spectrum simultaneously. The headlamp further comprises a reflector 200 and a front closure lens 300. The lens 300 is made of a material which is at least partly transparent to ultra violet radiation. It is also preferably smooth.

In the present example, the light bulb is in the form of a discharge lamp which is arranged to produce, between two electrodes, an elongated electric arc which is disposed essentially axially in the region of the optical axis Ox, in the well known way. The base of the discharge lamp is indicated at 102 in FIGS. 2 and 3, and its sealed ampoule or electrode unit at 104 in FIGS. 1 and 3. Its terminal pins 108 can be seen in FIGS. 2 and 3.

Because of the high light flux emitted by this type of lamp, a light shield 106, for shielding direct light emission, is also provided so as to prevent drivers or pedestrians outside the vehicle from being dazzled. In this example, the shield 106 is in the form of a hollow cylinder, closed at its front end and having its rear end open and formed with a complex profile (see FIG. 3), which is so designed that light rays that are directed towards optically inoperative parts of the reflector, such as its cheeks for example, will be intercepted by the shield. The screen or shield 106 is opaque to visible light. However, it is preferably (though not necessarily) at least partly transparent to ultra violet radiation.

The reflector 200 is, in this example, a reflector of small height but large width, being truncated in two substantially horizontal cheeks, namely an upper cheek 240 and a lower cheek 250. The working surface of the reflector 200 is divided into two distinct reflecting zones 210 and 220, which are arranged to transmit two respective light beams of different types. In the present example, the separation between these two zones is arranged along the vertical axial plane xOz of the projector. In a modification, the two reflecting zones 210 and 220 could be separated along two half planes passing through the optical axis ox, but having a substantial inclination to the horizontal as indicated by the broken lines P and P' in FIG. 1.

It is thus easily possible to modify the respective reflecting areas of the reflecting zones 210 and 220, and consequently the intensities of the two respective light beams. For example, the zone 210 of the reflector that lies on the left (as seen from the front) may comprise a portion having a reflecting surface which is arranged to produce of itself, that is to say without the intervention of an occulting shield or the like, the V-shaped cut-off line which is appropriate to a dipped beam such as is normal in European practice. It may for example comprise one half of a surface of the kind which is described for example in various forms in the specifications of U.S. Pat. Nos. 4,530,042, 4,772,988 and 4,803,601, and in the respective corresponding French published patent applications FR 2 536 502A, FR 2 599 121A and FR 2 609 148A. The disclosures of these various published documents are deemed to be incorporated in the present specification by reference, and reference is invited to them for further details.

In the present example, the right hand zone 220 of the reflector is part of a surface which is adapted to produce a beam which is essentially complementary to the dipped beam. This may for example comprise a portion of a paraboloid, with respect to the focus of which the arc is offset. Alternatively it may consist of one half of the surface of the kind described in the specification of U.S. Pat. No. 4,841,423 and the corresponding French published patent application No. FR 2 600 024A, the disclosure of which is again incorporated by reference in the present specification and to which reference is invited for further details.

Figure 4A:
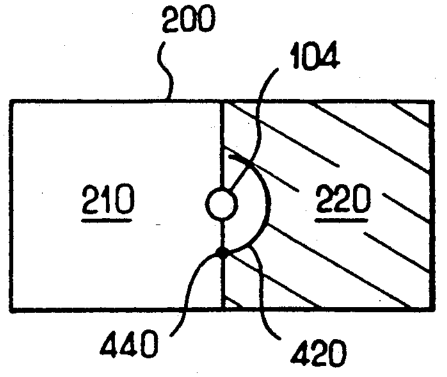
FIGS. 4a and 4b are diagrammatic front views of the headlamp seen in FIGS. 1 to 3, illustrating two possible modes of the latter.
Figure 4B:
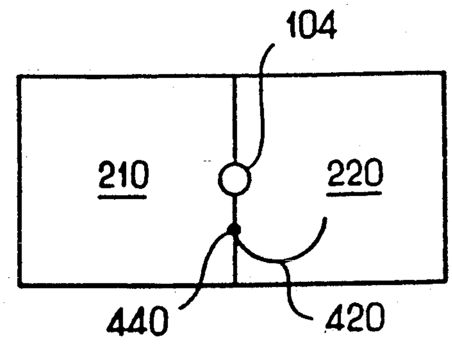

As can be seen in the diagrammatic views of FIGS. 4a and 4b (and not shown in FIGS. 1 to 3 in the interests of clarity), the headlamp also includes an occulting screen 420. In this example, the screen 420 is in the form of a half cylinder, having a horizontal axis which is essentially coincident with the optical axis. The screen 420 is articulated at one edge along an axis 440 which is parallel to the optical axis and which lies in the lower part of the light bulb. The axis 440, which is a pivot axis, may for example be located on the light shield 106. The occulting screen 420 is opaque to visible light, but is at least partly transparent to ultra violet radiation.

Actuating means (not shown), for example an electric motor or an electro magnet, can be controlled from within the cabin of the motor vehicle so as to displace the occulting screen 420 between a first or occulting position and a second or retracted position. In the occulting position, which is shown in FIG. 4a, the occulting screen 420 lies against the screen 106 so as to intercept the radiation issuing from the arc of the lamp towards the reflecting zone 220 of the reflector. In the retracted position which can be seen in FIG. 4b, the occulting screen 420 is disengaged from the screen 106, so that the zone 220 is now exposed to the radiation. It will be seen that, in this example, the zone 210 is always exposed to radiation.

It will be clear that in the position shown in FIG. 4a, only the zone 210 is active, so that the beam of light in the visible spectrum is a dipped beam according to European usage. It may be noted in this regard that the various surfaces mentioned above are able to produce the whole of the beam of themselves, even if only one half of the total reflecting surface is in use. The ultra violet radiation that is also emitted is at least partly transmitted through the occulting screen 420, so that the whole of the reflector then acts to reflect the ultra violet radiation.

With the occulting screen 420 in its retracted position as shown in FIG. 4*b*, the whole of the reflector takes part in the production of the light beam, so that the latter then consists of the main beam generated by the reflecting zone 210, together with the complementary beam generated by the reflecting zone 220, these beams being superimposed on each other to constitute a main or long-range driving beam.

With reference now to FIGS. 5*a* to 5*d*, these diagrammatic illustrations show four possible operating modes for a headlamp having a first reflecting zone 210, for example a surface which forms a dipped beam by itself, and a second reflecting zone 220 which is parabolic in shape, with a focus in the vicinity of the arc of the light bulb 100. Two occulting screens 410 and 420 are associated with the reflecting zones 210 and 220 respectively, for selectively exposing these reflecting zones to, or masking them from, the light emitted from the arc. One of the two occulting screens 410, 420, or (in a modification) both of them, is opaque to visible light but at least partly transparent to ultra violet radiation. In addition, the occulting screen 410 which is associated with the reflecting zone 210 of the reflector is formed with one or more small holes, as indicated at 412, through which a predetermined amount of light emitted by the arc is allowed to pass towards the reflector.

Figure 5A:
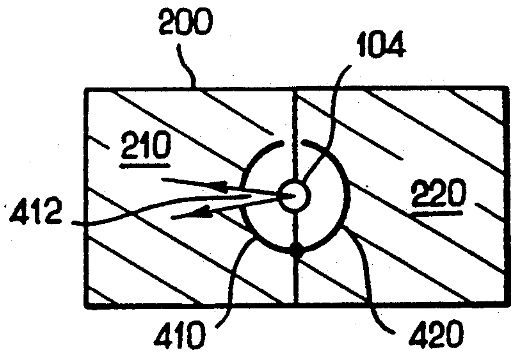
FIGS. 5a to 5d are similar diagrammatic front views, but showing respectively four possible modes for a headlamp in a modified embodiment of the invention.

In FIG. 5*a*, both of the screens 410 and 420 are in their occulting positions, so that only a small amount of visible light from the arc is able to escape towards the reflecting zone 210, which then reflects it forward in the normal way. This enables the headlamp to perform the function of a side lamp or parking lamp, producing a small quantity of light directed forwardly of the vehicle for merely indicating the presence of the vehicle rather than for illuminating the road. In this condition, ultra violet radiation is preferably emitted in a way that is either limited or not limited according to whether one or both of the occulting screens 410 and 420 are transparent to ultra violet radiation.

Figure 5B:
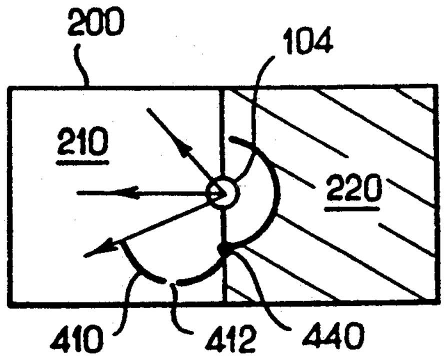

In FIG. 5*b*, the occulting screen 410 is open. This situation is equivalent to that shown in FIG. 4*a*, and the headlamp emits a dipped beam.

Figure 5C:
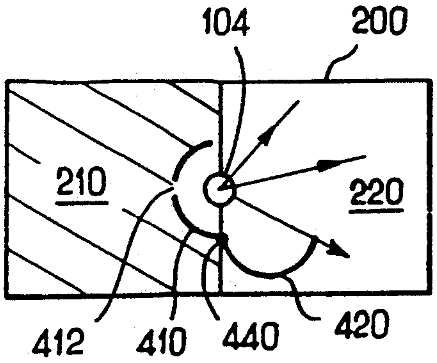

FIG. 5*c* shows the case in which the occulting screen 410 is closed while the other screen 420 is open. In this state, only the reflecting zone 220 of the reflector takes part in formation of the beam, so that the beam which is produced is an ordinary driving beam centred on the optical axis.

Figure 5D:
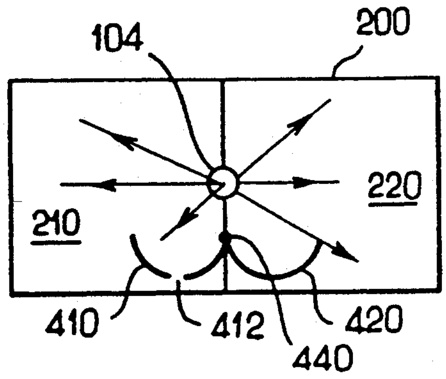

FIG. 5*d* shows a final possibility offered by the reflector in this form. By opening both of the occulting screens 410 and 420 at the same time, the main beam and the dipped beam are superimposed on each other, so as to produce an extremely powerful beam which gives very good illumination both at a distance and closer to the vehicle. In both of the two modes shown in FIGS. 5*c* and 5*d*, ultra violet radiation is emitted at least partly above the cut-off line defining the upper limit of the beam.

The headlamp thus offers four different lighting modes without requiring any electrical switching for the light bulb itself, the only control required being that necessary for appropriately actuating the means for moving the occulting screens. The quality of the light emitted in all four modes is excellent, and in each case it is accompanied by emission of ultra violet radiation of a long range type, that is to say not limited by any cut-off whatever, enabling anything that has a surface which is fluorescent under the effect of ultra violet radiation to be clearly visible, for example signposts, direction signs, road cones and other objects.

Figure 6A:
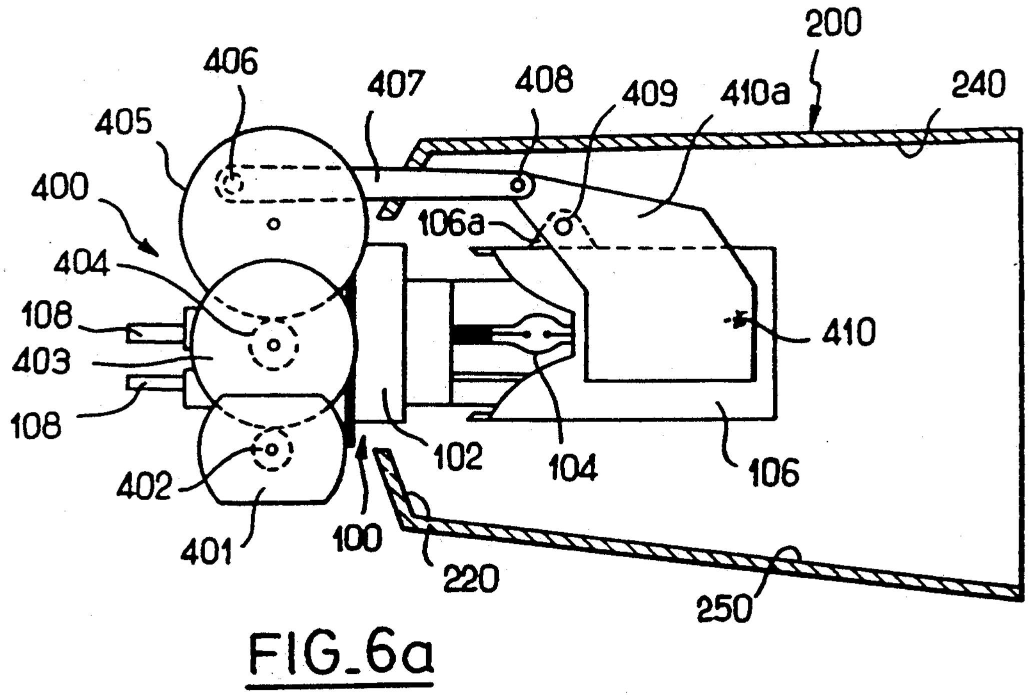
FIGS. 6a and 6b are side views of a particular embodiment of an occulting device in accordance with the invention, shown respectively in two different positions.
Figure 6B:
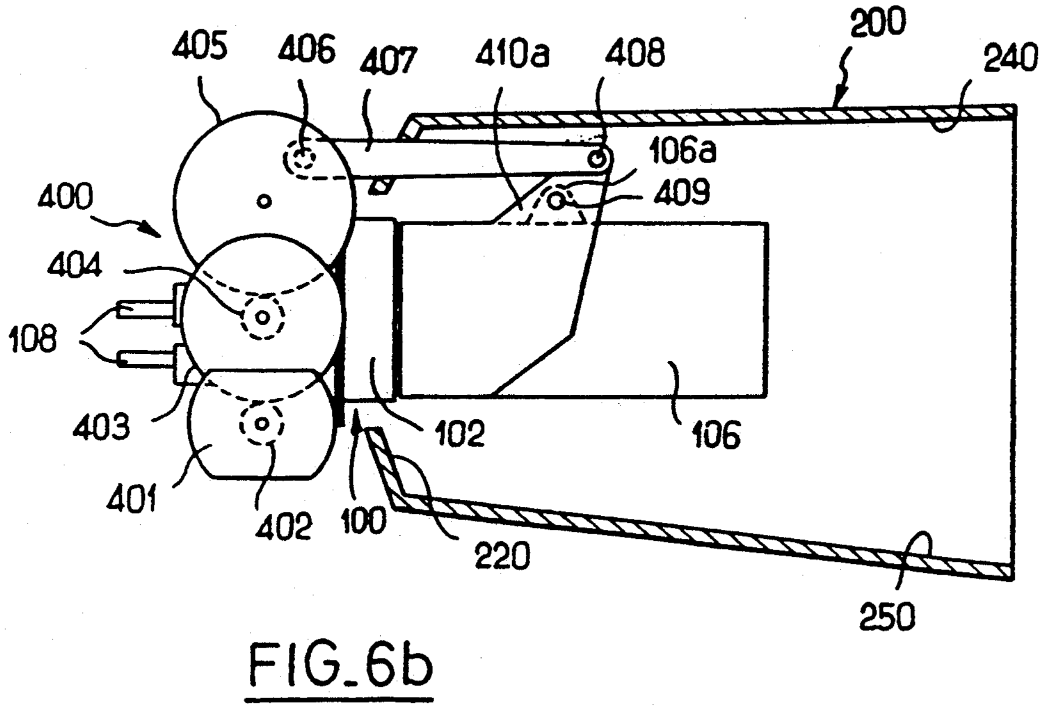

Reference is now made to FIGS. 6*a* and 6*b*, which illustrate one practical embodiment of the occulting means which can be used in headlamps of the kinds just described. FIGS. 6*a* and 6*b* show an occulting screen 440 for selectively masking the reflecting surface 210 of the reflector that lies on its left hand side as seen from the front, from the radiation emitted by the electric arc of the light bulb. A reversible electric motor (not shown), the output spindle of which carries a first gear wheel or pinion 402, is mounted on a common support (not shown), which may for example be fixed to the reflector or to the housing of the headlamp, and which may be made by moulding integrally with it. The pinion 402 meshes with a reduction gear train comprising toothed wheels 403, 404 and 405. The final toothed wheel 405 of the reduction gear train has an eccentric crank pin 406, on which a first end of a connecting rod 407 is articulated.

The light screen 106, which in this example has a transverse cross section that is essentially square, has a vertically extending lug 106*a* carrying a pivot pin 409. The occulting screen 410 is extended in a bracket element 410*a*, which is pivoted on the pivot pin 409 so that the occulting screen 410 is articulated on the light screen 106. At the free end of the bracket element 410*a*, that is to say its end remote from the working or occulting part of the screen, there is a further pivot pin 408 on which the other end of the connecting rod 407 is articulated.

It will be understood that, when the motor 401 is energised, the occulting screen 410 is moved, by operation of the motor through the transmission constituting the various pinion and tooth wheels 402 to 405 and the connecting rod 407, from its non-occulting or retracted position shown in FIG. 6*a* to its occulting position shown in FIG. 6*b*, and vice versa. In order to ensure the precise positioning of the occulting screen in each of these two positions, micro switches may for example be provided in appropriate positions in the transmission so as to interrupt the power supply to the motor at the end of the travel of the screen (not shown). Alternatively, a suitable positional control means may be provided. Both of these expedients are well known in the art.

It will be noted that the occulting screen 410 has a profile such that in its occulting position (FIG. 6*b*) it obturates the whole of the space lying between the rear edge of the light screen 106 and the base 102 of the discharge lamp, thus effectively preventing any visible light from reaching the reflecting zone 210 of the reflector.

The occulting screen may for example consist of a support, made of tinted glass or toughened glass, on which there is deposited a thin layer of a material which is in general terms a dielectric material absorbing radiation in the visible spectrum, but allowing ultra violet radiation to pass through at least to some extent. This coating material may for example have a metal oxide base, for example titanium dioxide ($TiO_2$) or silica (SiO). The occulting screen may alternatively be of the narrow band interference filter type, for example that known as a Fabry-Perot filter; or it may be in the form of a diffraction screen.

The arrangements described above enable a number of different functions to be performed by the headlamp, namely those of warning, route indication, parking indication, and emission of ultra violet radiation. This leads to substantial economies as compared with known systems in which a number of different lamps are required for these various purposes. In addition, because the ultra violet radiation is at least partly reflected by a reflecting zone of the reflector that gives a road illuminating function, it enables the efficiency and the range of the latter to be increased by a considerable amount.

The present invention is of course in no way limited to the various embodiments described above and shown in the drawings. In particular, although the light bulb can consist of a discharge lamp, this being of particular advantage for the obvious reason of its high light output, it will be clear that the invention remains advantageous even if the source of visible light consists of a conventional tungsten filament lamp. In that case, an additional lamp adapted to emit ultra violet radiation is mounted close to the tungsten filament lamp, the lamp means or "light bulb" then consisting of these two lamps considered together.

In addition, any other combination of beams, besides those described above, may be adopted. For example, it is possible to arrange for one of the reflecting zones to generate a dipped beam to European standards in the manner described above, while the other reflecting zone can be parabolic, and may be offset from the centre. Alternatively, this other zone may have a surface which is adapted to generate a beam complementary to a dipped beam. In the headlamps described above, it is also possible to replace the reflecting zone which generates the dipped beam by a reflecting zone which by itself generates a beam for penetrating fog, and having for example a surface such as that which is described in the specification of French published patent application No. FR 2 536 503A, the disclosure of which is incorporated by reference in this present description.

A further possibility consists in using for the occultable reflecting zone 220 a portion of a paraboloid which is focussed on the light source and which gives a beam of the spotlight type, i.e. an extremely concentrated beam. The non-occultable zone 210 may then be a surface of the kind described in the specification of U.S. Pat. No. 4,803,601 and the corresponding French published patent application No. FR 2 609 148A, such as to produce a wide driving beam of itself.

Finally, electro mechanical occulting means of the kind described above may be arranged in numerous different ways. For example, they may be driven by means of an electro magnet instead of an electric motor. It is also possible to use occulting means which are actuated in a way other than by electro mechanical means, for example an electro-optical screen of the kind that can be shifted selectively between an opaque state and a transparent state according to the value of an electrical voltage which is applied to its terminals.

In general terms, the person skilled in the art will be able to design and produce occulting means having a sufficiently rapid switching speed to enable appropriate regulations to be satisfied, in particular in regard to the speed of changing between a main beam mode and a dipped beam mode, and as regards regulations relating to headlamps generally.

What is claimed is:

1. A multi-function headlamp for a motor vehicle comprising:

a reflector;

lamp means constituting a light source and disposed within the reflector, and adapted for emitting visible light and ultra violet radiation simultaneously, the lamp means defining an optical axis;

occulting means associated with the lamp means for defining a cut-off line whereby to produce a dipped beam;

a front closure lens, made of a material which is at least partially transparent to ultra violet radiation and overlying an open front of the reflector, the occulting means being opaque to visible light radiation but at least partially transparent to ultra violet radiation, and the multi-function headlamp further including means mounting the occulting means for displacement of the occulting means between an occulting position in which it intercepts all visible radiation directed above the cut-off line of the beam defined by the occulting means, and a retracted position in which the transmission of visible light radiation is substantially unaffected by the occulting means, wherein the reflector has a height and comprises a first reflecting zone and a second reflecting zone, for generating two respective different light beams, said first and second reflecting zones being disposed side by side and each extending over the whole height of the reflector, with each of said first and second reflecting zones comprising a part of a reflecting surface which of itself generates an associated beam, and wherein the said occulting means comprise at least one screen which, in the said occulting position, is situated laterally of the said lamp means.

2. A headlamp according to claim 1, wherein at least the said first reflecting zone of the reflector comprises a surface which is adapted to generate by itself a beam lying below a cut-off line which is oriented generally horizontally.

3. A headlamp to according claim 2, wherein the said first reflecting zone comprises a surface adapted to form images of the light source constituted by the said lamp means, the uppermost points of said images being situated near the cut-off line of the beam.

4. A headlamp according to claim 2, wherein the said second reflecting zone of the reflector comprises a surface which is adapted to generate a beam concentrated about the optical axis.

5. A headlamp according to claim 4, wherein the said occulting means comprise a single screen which is opaque to visible light radiation but at least partly transparent to ultra-violet radiation, for selectively occulting visible light radiation emitted by the light source towards the said second reflecting zone of the reflector.

6. A headlamp according to claim 5, further including a shield associated with the lamp means, driving means for changing the position of said occulting screen, transmission means coupling said driving means with said occulting screen, and at least one horizontal pivot element fixed to said shield, said occulting screen comprising a plate which is pivoted on said at least one horizontal pivot element.

7. A multi-function headlamp for a motor vehicle comprising:

a light source for simultaneously emitting visible light and ultraviolet radiation and located within a reflector, said light source defining an optical axis, said reflector having a height, an open front, a first reflecting zone having a surface adapted to generate an associated beam lying below a cut-off line and a second reflecting zone having a surface adapted to generate an associated beam concentrated about said optical axis, said first and said second reflecting zones being disposed side by side and each extending over the whole height of the reflector, a screen for selectively occulting visible light emitted towards said second reflecting zone, said screen being opaque to visible light but at least partly transparent to ultraviolet radiation and associated with said light source for defining said cut-off line to produce a dipped beam, a shield associated with said light source, said shield being opaque to visible light but at least partly transparent to ultraviolet radiation, a front closure lens of a material at least partly transparent to ultraviolet radiation and overlaying said open front, and means for mounting said screen for displacement between an occulting position in which said screen is located laterally of said light source and in which said screen intercepts all visible light directed above said cut-off line and a retracted position in which said visible light is transmitted relatively unaffected by said screen.

* * * * *